(No Model.) 2 Sheets—Sheet 1.

T. SPEIGHT & H. W. WHITEHEAD.
MACHINE FOR OILING AND DRYING WOOL.

No. 345,185. Patented July 6, 1886.

Witnesses.
Dennis Sumby.
Robert Everett.

Inventors.
Thomas Speight
Henry W. Whitehead,
By James L. Norris.
Atty.

(No Model.) 2 Sheets—Sheet 2.
T. SPEIGHT & H. W. WHITEHEAD.
MACHINE FOR OILING AND DRYING WOOL.
No. 345,185. Patented July 6, 1886.
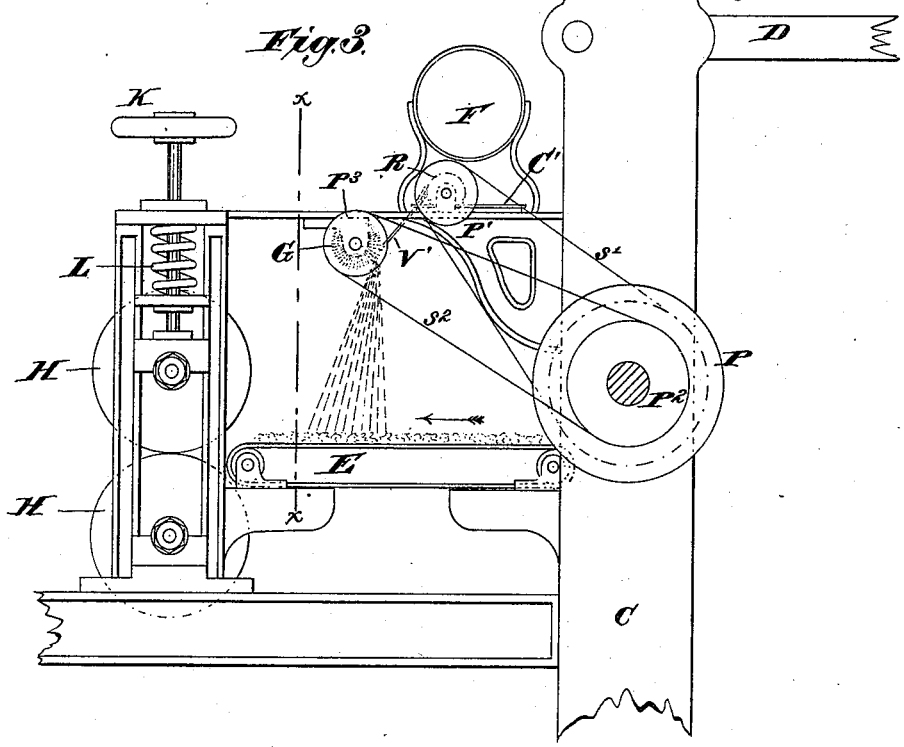
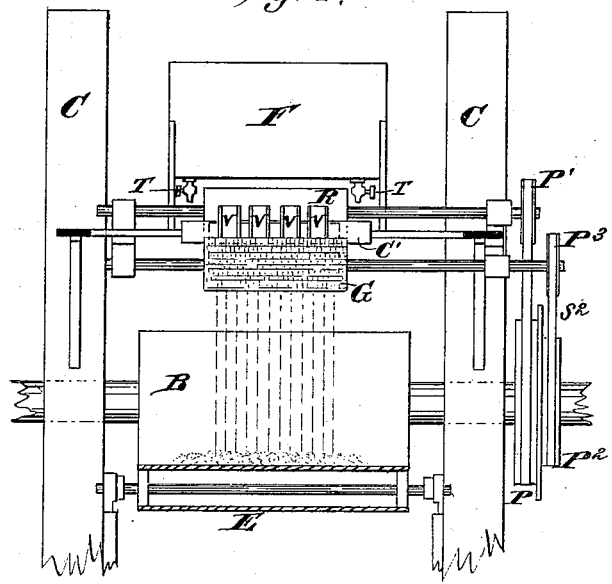
Witnesses:
H. R. McCready
Robert Everett
Inventor:
Thomas Speight
Henry W. Whitehead,
By James L. Norris.
Atty.

United States Patent Office.

THOMAS SPEIGHT, OF BRADFORD, AND HENRY WALTON WHITEHEAD, OF LEEDS, COUNTY OF YORK, ENGLAND.

MACHINE FOR OILING AND DRYING WOOL.

SPECIFICATION forming part of Letters Patent No. 345,185, dated July 6, 1886.

Application filed November 23, 1885. Serial No. 183,761. (No model.) Patented in England March 18, 1885, No. 3,506.

*To all whom it may concern:*

Be it known that we, THOMAS SPEIGHT and HENRY WALTON WHITEHEAD, subjects of the Queen of Great Britain and Ireland, and residing, respectively, at Bradford and Leeds, both in the county of York, England, have invented certain Improvements in Machines for Oiling and Drying Wool, (for which we have obtained Letters Patent in Great Britain, No. 3,506, dated 18th day of March, 1885,) of which the following is a specification.

This invention has for its object to provide novel means for removing superfluous moisture from wool, and then oiling and drying the latter.

The object of our invention we accomplish in the manner and by the means hereinafter described and claimed, reference being made to the accompanying drawings, in which—

Figure 1:
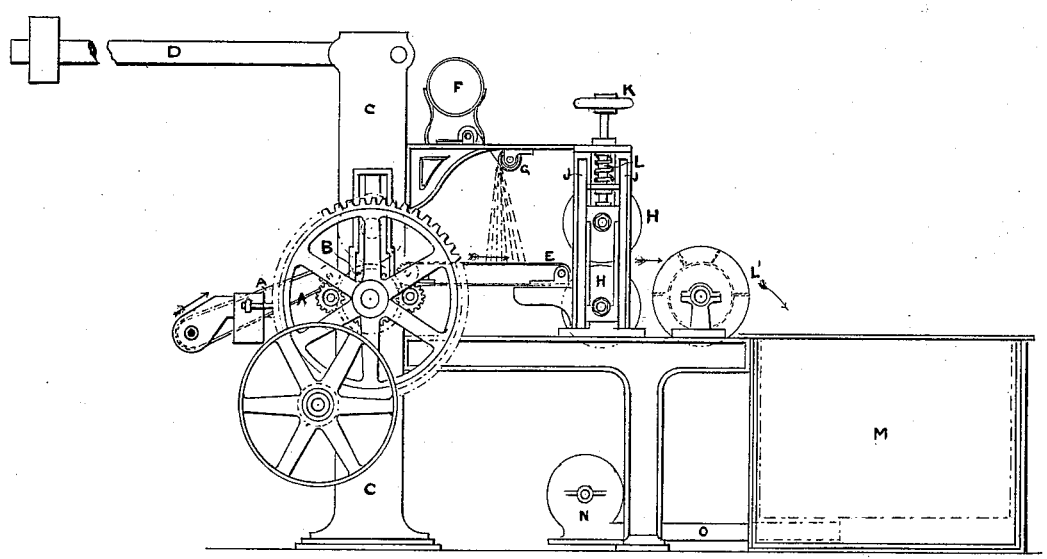
Figure 2:
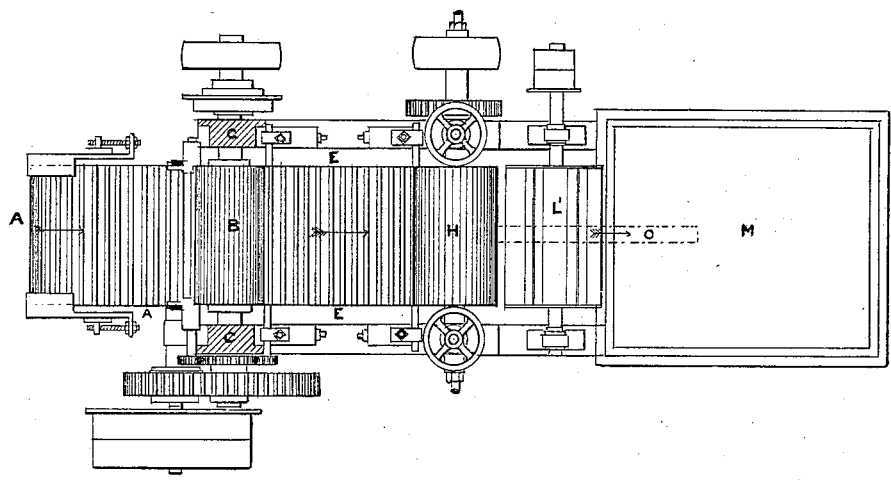

Figure 1 is a side elevation of a machine embodying our invention; Fig. 2, a top or plan view thereof, omitting the oiling devices, and showing part of the frame-work in section; Fig. 3, a side elevation of a part of the machine, looking at the side opposite to that shown in Fig. 1; Fig. 4, a sectional view on the line *x x* of Fig. 3, omitting one of the squeezing-rollers; and Fig. 5, a detail view of parts of the oiling devices, the oil-pan being in section.

To carry out our invention we make use of a pair of metallic rollers mounted in a vertical frame. The top roller is covered with a layer of slivers of wool. The object of these rollers is to squeeze out the superfluous water or suds from the wool which is passed between them. The wool, after passing between these rollers, is carried along by an endless apron or sheet covered with laths of iron or wood, and which apron or sheet receives motion from one or more of the rollers over which it passes. The wool, during the time that it is being carried along upon this apron or sheet, is oiled by an automatic apparatus, so that the oil may be more thoroughly mixed with the wool when it passes immediately afterward between heated rollers.

The metallic rollers between which the oiled wool is passed after it leaves the apron or sheet, hereinbefore mentioned, are heated by steam, and the top roller receives downward pressure from springs actuated by adjusting-screws or from weighted levers. The object of passing the wool between these heated rollers is to further dry it, and to bring it into a better condition for the carding process, whereby better work is effected, and the wool, being better dried, has not the same destructive effect upon the card-clothing, as hitherto with imperfectly-dried wool. The wool, after leaving the heated rollers, is caught by the wings of a revolving beater, whereby it is opened out to let the air pass through it, and is thrown forward into a basket or box, which is perforated to admit heat from a coil of steam-pipes or from a steam-jacket, or from a current of heated air driven in by means of a fan or otherwise.

The wool, after passing up the endless sheet or apron A, is caught by the two rollers B, the shafts of which revolve in bearings in the upright frame C, and the top roller is forcibly pressed downward by weighted levers D. When passing between the rollers B, (the top one of which may be covered with a layer of slivers of wool,) a great portion of the water or suds contained in the wool being operated upon is squeezed out, and thus far the operation resembles that to which wool is subjected when leaving an ordinary wool-washing machine, such as has been hitherto in use; but immediately after passing between the two squeezing-rollers B the partially-dried wool is conveyed along the upper surface of the endless apron or sheet E, which apron or sheet is driven by one or more of the rollers over which it passes. During the time that the wool is passing along the apron or sheet E the wool is oiled by means of an automatic apparatus, of which a simple modification is represented in the drawings, Fig. 1, the receptacle to contain the oil being shown at F, and the revolving brush G, for sprinkling the oil upon the wool passing beneath it.

The oil from the receptacle F flows into the shallow pan C' through the tap T. The roller R is driven by the belt S' on pulleys P and P', and revolves in the oil in the pan C'. A portion of the oil adheres to the circumference of the roller, which is removed therefrom by the scrapers V, which convey it to the wide inclined plate V', and is removed therefrom by the revolving brush G, driven by the belt $S^2$ on the pulleys $P^2$ and $P^3$, the brush distributing it onto the layer of wool on the endless apron or sheet E. The wool, after it has passed along the apron or sheet E, is caught by the rollers H, which are heated by steam. These rollers are carried by bearings fitted in the upright frames J, and the top roller receives downward pressure from the spiral springs L, which pressure can be regulated as required by the screw and hand-wheel K. The object of these heated rollers H is to further dry the wool by combined heat and pressure, and by this more effectual process of drying to bring the wool into a better state for the process of carding, and at the same time and by the same means to prevent the damage and destruction to the card-clothing which is caused by damp wool. After passing between the heated rollers H, as described, the wool is caught by the rapidly-revolving wings of a beater, L', which in its revolution opens out the wool and brings all parts of it in contact with the air, thereby facilitating the process of drying, and also throws it forward in a loose and open state into the box or basket M, which is heated by means of a coil of steam-pipes placed under a perforated false bottom, or by a steam-jacket, or by means of a current of warm air blown through or into the box or basket M by means of the fan N, to which the bottom of the box or basket is connected by the pipe O, which passes into the space formed by the false bottom, as described, or by other means.

The wool is more effectually dried after it has remained a short time in the box or basket M, and the process of drying, in combination with the process of oiling, as hereinbefore described, is effected without discoloration or damage to the fiber of the wool, and with more regularity of oiling and with a saving of oil and labor.

What we claim is—

1. The combination of rollers for squeezing the superfluous moisture from the wool, a conveyer receiving the wool from said rollers, oil-sprinkling devices arranged above the conveyer for oiling the wool as it is carried by the conveyer, and heated drying-rollers receiving the wool from the conveyer, substantially as described.

2. The combination of a wool-conveyer, A, rollers for receiving the wool and squeezing out the superfluous moisture therefrom, a conveyer receiving the wool from the squeezing-rollers, an oil-sprinkling brush arranged above the conveyer for supplying the moving wool with oil, an oil-receptacle for supplying the brush with oil, and heated drying-rollers receiving the wool from the latter conveyer, substantially as described.

3. The combination of a pair of rollers for squeezing the superfluous moisture from the wool, a conveyer receiving the wool from the rollers, oil-sprinkling devices arranged above the conveyer for supplying the moving wool with oil, heated drying-rollers receiving the oiled wool from the conveyer, and a beater for receiving the wool from the drying-rollers and spreading it open to the air, substantially as described.

4. The combination of rollers for squeezing the superfluous moisture from wool, a conveyer for receiving the wool from said rollers, an elevated oil-receptacle, a revolving oil-distributing brush, and means for supplying oil from the receptacle to the brush, substantially as described.

5. The combination of rollers for squeezing the superfluous moisture from wool, a conveyer for receiving the wool from the squeezing-rollers, drying-rollers receiving the wool from the conveyer, an elevated oil-receptacle, a revolving oil-distributing brush arranged over the conveyer, and conduits for conveying oil from the receptacle to the brush, substantially as described.

6. The combination of the squeezing-rollers, the conveyer for receiving the wool therefrom, the oil-sprinkler, the drying-rollers, the beater, the receiving-basket, and means for heating the latter, substantially as described.

In testimony whereof we have signed our names to this specification in the presence of two subscribing witnesses.

THOMAS SPEIGHT.
HENRY WALTON WHITEHEAD.

Witnesses:
ARTHUR JOSEPH TAYLOR,
CHAS. GILLIARD.